US008899506B2

(12) United States Patent
 Takechi (10) Patent No.: US 8,899,506 B2
(45) Date of Patent: Dec. 2, 2014

(54) DUAL-BEARING REEL DRAG REGULATION MECHANISM

(71) Applicant: Shimano Inc., Sakai, Osaka (JP)

(72) Inventor: Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 84 days.

(21) Appl. No.: 13/645,076

(22) Filed: Oct. 4, 2012

(65) Prior Publication Data

US 2013/0161433 A1   Jun. 27, 2013

(30) Foreign Application Priority Data

Dec. 22, 2011   (JP) ................................. 2011-280861

(51) Int. Cl.
 *A01K 89/01*   (2006.01)
(52) U.S. Cl.
 USPC ............................. 242/304; 242/286; 242/310
(58) Field of Classification Search
 CPC .......................... A01K 89/033; A01K 89/0155
 USPC ................................... 242/286, 304, 310, 317
 See application file for complete search history.

(56) References Cited

U.S. PATENT DOCUMENTS

| | | | | |
|---|---|---|---|---|
| 4,871,129 A * | 10/1989 | Hashimoto | .................... | 242/255 |
| 4,901,944 A * | 2/1990 | Aoki | ............................. | 242/260 |
| 6,578,785 B1 * | 6/2003 | Hong | ............................. | 242/245 |
| 7,234,661 B2 * | 6/2007 | Hirayama et al. | ............ | 242/303 |
| 7,784,725 B2 * | 8/2010 | Chun Wee et al. | ............ | 242/247 |
| 7,850,110 B2 * | 12/2010 | Hirayama et al. | ............ | 242/304 |
| 2006/0016924 A1 * | 1/2006 | Hirayama et al. | ............ | 242/245 |
| 2006/0138267 A1 * | 6/2006 | Ikuta et al. | .................... | 242/245 |
| 2009/0277984 A1 * | 11/2009 | Wee et al. | .................... | 242/257 |
| 2010/0006689 A1 * | 1/2010 | Ikuta et al. | .................... | 242/306 |
| 2010/0084499 A1 * | 4/2010 | Hirayama et al. | ............ | 242/303 |
| 2010/0123035 A1 * | 5/2010 | Hirayama | .................... | 242/303 |

FOREIGN PATENT DOCUMENTS

| | | |
|---|---|---|
| JP | S49-16319 B | 4/1974 |
| JP | H04-100388 U | 8/1992 |
| JP | H05-25424 Y | 6/1993 |

* cited by examiner

*Primary Examiner* — Emmanuel M Marcelo
(74) *Attorney, Agent, or Firm* — Global IP Counselors (57) ABSTRACT

A dual-bearing reel drag regulation mechanism includes a drag regulation lever including an attachment potion configured to pivot about a rotation axis of the spool between a free position and a maximum position, an operating portion extending from the attachment portion to a tip of the drag regulation lever, and an intermediate positioning mechanism including a positioning member. The positioning member is retractably attached to the lateral surface of the reel unit at an intermediate position between the free position and the maximum position. The positioning member is arranged to be in a protruding state or a retracting state. The intermediate positioning mechanism is configured to cause the positioning member to make contact at the intermediate position with a contact portion of the operating portion in pivoting the drag regulation lever, when the positioning member is in the protruding state.

7 Claims, 6 Drawing Sheets

DUAL-BEARING REEL DRAG REGULATION MECHANISM

CROSS-REFERENCE TO RELATED APPLICATIONS

This application claims priority to Japanese Patent Application No. 2011-280861 filed on Dec. 22, 2011. The entirety of disclosure of Japanese Patent Application No. 2011-2806-861 is hereby incorporated by reference in its entirety.

BACKGROUND

1. Field of the Invention

The present invention relates to a dual-bearing reel drag regulation mechanism, particularly to a dual-bearing reel drag regulation mechanism configured to regulate drag force which brakes a spool rotatable with respect to a reel unit 2. Background Art Dual-bearing reels are normally embedded with a drag mechanism configured to brake spool rotation in a fishing-line releasing direction. Lever drag mechanisms, a type of drag mechanisms, are superior to star drag mechanisms in operability and accuracy in drag regulation. Therefore, the lever drag mechanisms are normally used for large-sized dual-bearing reels.

A well-known drag regulation mechanism, which regulates drag force, includes a drag regulation lever, a moving mechanism, and a sound producing mechanism. The drag regulation lever is pivotably attached to a reel unit. The moving mechanism is configured to axially move a spool shaft in conjunction with pivot of the drag regulation lever. The sound producing mechanism is configured to produce sound in conjunction with pivot of the drag regulation lever for making an angler feel a sense of click.

In some well-known dual-bearing reels including the lever drag mechanism of the aforementioned type, a strike position (i.e., an intermediate position) is set between a free position and a maximum position of the drag regulation lever. The strike position is normally set for obtaining a drag of roughly one-third of the tensile strength of the fishing line. An intermediate positioning mechanism is provided for positioning the drag regulation lever in the strike position (see e.g., Japan Utility Model Application Publication No. JP-U-H04-100388, Examined Utility Model Registration No. JP-Y-H05-25424 and Examined Patent Application Publication No. JP-B-S49-16319).

The intermediate positioning mechanism of the aforementioned type includes a positioning member and a spring member. The positioning member is protrudably/retractably attached to the top surface of the reel unit at the strike position between the free position and the maximum position. The spring member urges the positioning member in the protruding direction. When the drag regulation lever is operated and pivoted towards the strike position from the free position, the intermediate positioning mechanism can position the drag regulation lever at the strike position while the positioning member protruding from the top surface of the reel unit makes contact with the tip of the drag regulation lever.

SUMMARY

In the well-known intermediate positioning mechanism, the drag regulation lever is positioned at the strike position while the positioning member protruding from the top surface of the reel unit makes contact with the tip of the drag regulation lever. In the intermediate positioning mechanism, the positioning member is disposed while being protruding from the top surface of the reel unit. Therefore, the fishing line can get stuck with the positioning member. Further, in the intermediate positioning mechanism, the positioning member is configured to make contact with the tip of the drag regulation lever. Therefore, it is required to form a pad on the tip of the drag regulation lever for receiving the positioning member. Therefore, it is remarkably difficult to form the tip of the drag regulation lever in an easily operable shape for an angler.

It is an advantage of the present invention to provide a dual-bearing reel drag regulation mechanism whereby a fishing line can be prevented from getting stuck with a positioning member and a drag regulation lever can be formed in an easily operable shape.

A dual-bearing reel drag regulation mechanism is configured to regulate drag force which brakes a spool rotatable with respect to a reel unit. The dual-bearing reel drag regulation mechanism includes a drag regulation lever and an intermediate positioning mechanism. The drag regulation lever includes an attachment potion attached to a lateral surface of the reel unit and a operating portion. The attachment portion is configured to pivot about a rotation axis of the spool between a free position and a maximum position, wherein the free position corresponds to a drag free state for the spool to be freely rotated, and the maximum position corresponds to a maximum drag state of the drag mechanism. The operating portion extends from the attachment portion to a tip of the drag regulation lever, and is configured to pivot. The intermediate positioning mechanism includes a positioning member. The positioning member is retractably attached to the lateral surface of the reel unit at an intermediate position between the free position and the maximum position. The positioning member is arranged to be in a protruding state or a retracting state. The intermediate positioning mechanism is configured to cause the positioning member to make contact at the intermediate position with a contact portion of the operating portion in pivoting the drag regulation lever, when the positioning member is in the protruding state. The contact portion of the operating portion is disposed closer to the attachment portion than a longitudinal center of the operating portion.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
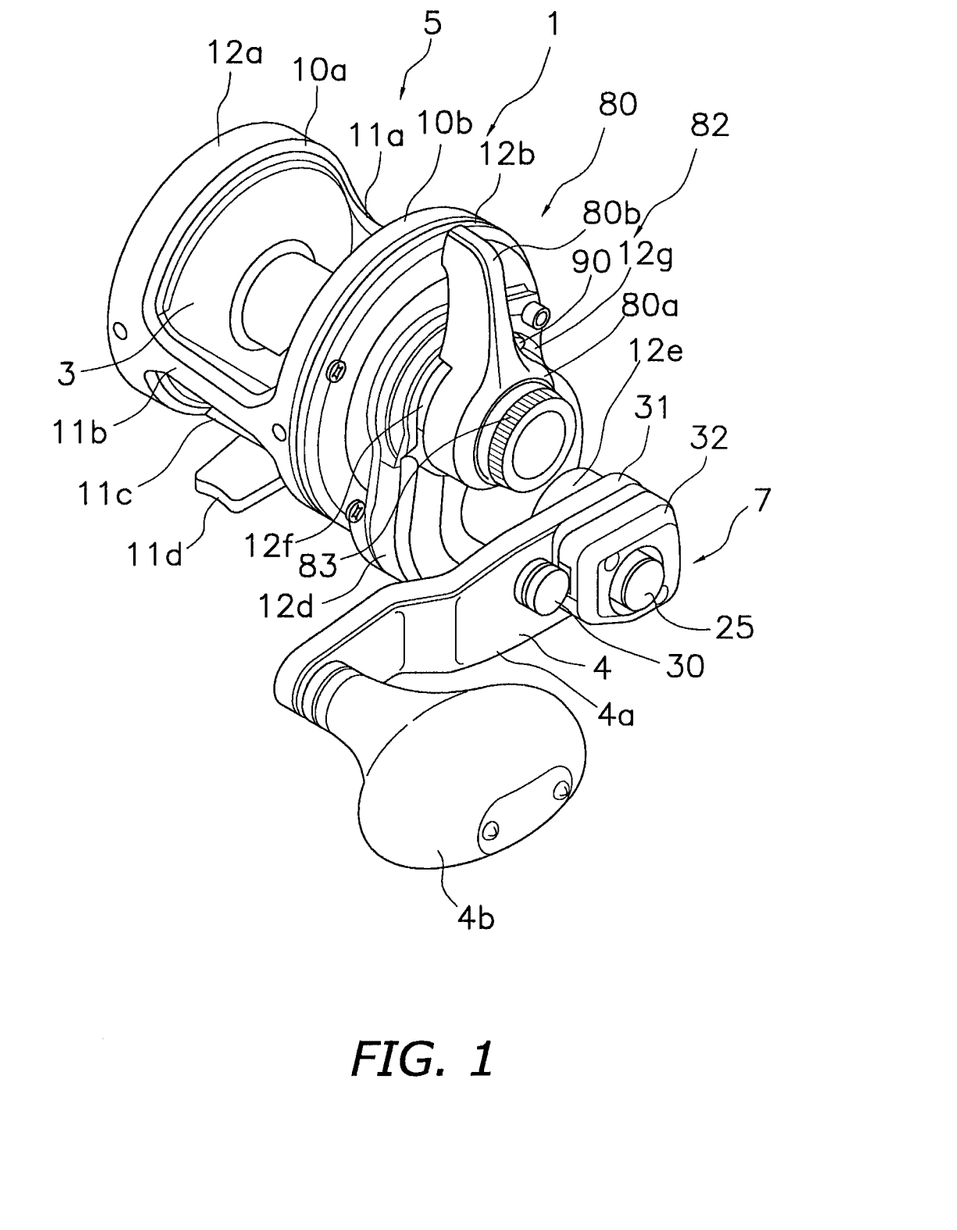
FIG. 1 is a perspective view of a dual-bearing reel employing an exemplary embodiment of the present invention.
Figure 2:
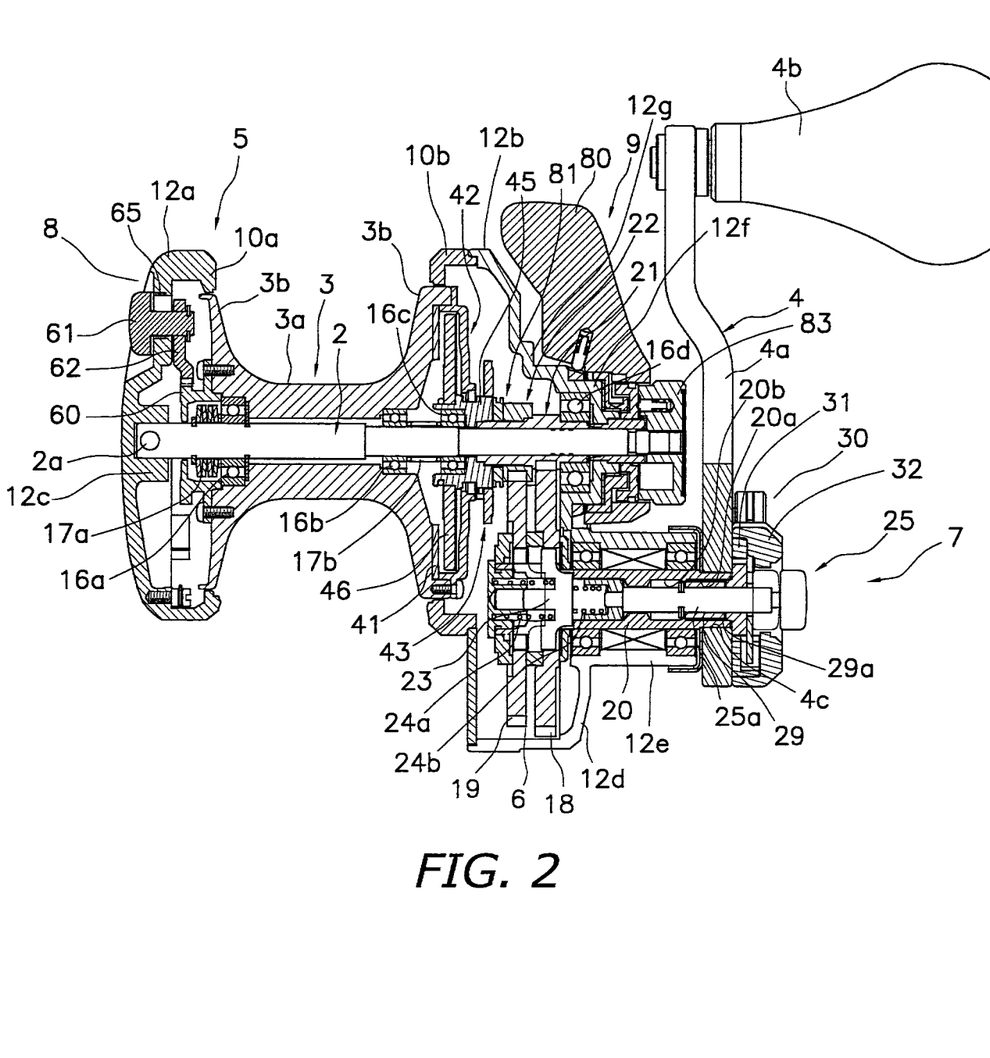
FIG. 2 is a cross-sectional view of the dual-bearing reel.

As illustrated in FIGS. 1 and 2, a dual-bearing reel employing an exemplary embodiment of the present invention is a medium-sized lever drag reel. The lever drag reel includes a tubular reel unit 1, a spool shaft 2, a spool 3, and a handle 4. The spool shaft 2 is mounted to the center part of the reel unit 1 while being non-rotatable and axially movable. The spool 3 is supported by the spool shall 2 while being rotatable and axially immovable. The handle 4 is disposed laterally to the reel unit 1. As illustrated in FIG. 2, the lever drag reel further includes a rotation transmission mechanism 6 and a lever drag mechanism 9 in the inside of the reel unit 1. The rotation transmission mechanism 6 is configured to deliver rotation of the handle 4 to the spool 3. The lever drag mechanism 9 is configured to brake rotation of the spool 3 in the fishing-line releasing direction.

As illustrated in FIG. 1, the reel unit 1 includes a frame 5 made of metal. The frame 5 includes a right and left pair of a first side plate 10a and a second side plate 10b and coupling portions 11a, 11b, and 11c and a first cover member 12a. The first side plate 10a and the second side plate 10b are saucer-shape plates made of metal. The coupling portions 11a, 11b, and 11c couple the first side plate 10a and the second side plate 10b at the front, the rear, and the bottom of the frame 5. The first cover member 12a is integrally formed with the first side plate 10a for covering the outside of the first side plate 10a.

The coupling portion 11c of the frame 5 has a fishing-rod attachment portion 11d integrally formed therewith for attaching the lever drag reel to a fishing rod. The first and second side plates 10a, and 10b, the coupling portions 11a, 11b, and 11c and the first cover member 12a are integrally formed by metal cutting work.

As illustrated in FIG. 1, the reel unit 1 includes a second cover member 12b made of metal for covering the outside of the second side plate 10b. Further, each of the first and second side plates 10a and 10b has an opening for allowing the spool 3 to pass therethrough. The first cover member 12a has a boss portion 12c in the inside thereof. The boss portion 12c supports the left end of the spool shaft 2 in an axially movable and non-rotatable state. As illustrated in FIG. 2, the first cover member 12a accommodates a spool sound producing mechanism 8 in the inside thereof. The spool sound producing mechanism 8 is configured to produce sound in conjunction with rotation of the spool 3.

As illustrated in FIG. 2, the spool sound producing mechanism 8 is a mechanism configured to produce sound in conjunction with rotation of the spool 3. Further, the spool sound producing mechanism 8 can be switched between a sound activation state of being allowed to produce sound and a sound deactivation state of being prevented from producing sound. As illustrated in FIG. 2, the spool sound producing mechanism 8 includes a convexo-concave member 60, an operating member 61, a sound producing member 62, an urging member (not illustrated in the figures), and a collar member 65. The convexo-concave member 60 is configured to be rotated in conjunction with rotation of the spool 3. The operating member 61 is attached movably in the both directions closer to and away from the convexo-concave member 60. The sound producing member 62 is pivotably attached to the operating member 61. The urging member urges the sound producing member 62 towards the convexo-concave member 60. The collar member 65 is an elastic member attached to an elongated aperture (not illustrated in the figures) formed in the first cover member 12a for positioning the operating member 61 in either the sound activation position or the sound deactivation position.

As illustrated in FIGS. 1 and 2, the second cover member 12b, which is disposed on the handle 4 side, has a bulged portion 12d. The bulged portion 12d protrudes in both a radial direction and an axially outward direction. As illustrated in FIG. 2, the bulged portion 12d accommodates the rotation transmission mechanism 6. Further, the second cover member 12b has a first support tubular portion 12e in the lower part of the bulged portion 12d. The first support tubular portion 12e is protrudes axially outwards and supports a handle shaft 20 of the handle 4.

As illustrated in FIG. 2, the spool shaft 2 is supported by the boss portion 12c of the first cover member 12a and the second cover member 12b while being axially movable and non-rotatable. The spool shaft 2 is provided with an anti-rotation pin 2a. Specifically, the anti-rotation pin 2a is attached to the left distal end of the spool shaft 2 while penetrating through the spool shaft 2 along a radial direction. On the other hand, the boss portion 12c of the first cover member 12a has an anti-rotation slit (not illustrated in the figures) to be engaged with the anti-rotation pin 2a. The anti-rotation slit is formed along a radial direction of the boss portion 12c.

The spool shaft 2 supports the spool 3 in a rotatable state through two first and second bearings 16a and 16b disposed on the outer peripheral surface thereof. The first bearing 16a is urged axially inwards (i.e., rightwards in FIG. 2) by a first spring member 17a of a disc-spring type. On the other hand, the second bearing 16b is urged axially inwards (i.e., leftwards in FIG. 2) by a second spring member 17b of a coil-spring type. Further, the axial inner surfaces of the first and second bearings 16a and 16b are prevented from inwardly moving by the spool 3 and the spool shaft 2. The structure enables the spool shaft 2 and the spool 3 to unitarily move in the axial direction. The spool shaft 2 is axially moved with the spool 3 by the lever drag mechanism 9.

As illustrated in FIG. 2, the spool 3 has a bobbin trunk 3a and a pair of flanges 3b integrally formed on the both ends of the bobbin trunk 3a. In addition, a friction disc 41 is fixed to the end surface of the right-side flange 3b by means of a screw. The friction disc 41 forms a part of the lever drag mechanism 9.

As illustrated in FIG. 2, the handle 4 is secured to the protruding end of the tubular handle shaft 20 disposed below and in parallel to the spool shaft 2. The handle shaft 20 is rotatably supported by the reel body 1. As illustrated in FIG. 2, the handle shaft 20 has a through hole 20b axially penetrating through the inside thereof.

As illustrated in FIG. 2, the rotation transmission mechanism 6 includes a speed change operating mechanism 7 configured to switch handle rotation between a high speed level and a low speed level. As illustrated in FIG. 2, the speed change operating mechanism 7 includes a first main gear 18, a second main gear 19, a first pinion gear 21, a second pinion gear 22, an engaging piece 23, a first compression spring 24a, a second compression spring 24b, and an operation shaft 25. The first main gear 18 and the second main gear 19 are respectively supported by the handle shaft 20 of the handle 4 in a rotatable state. The first main gear 18 is used for winding the fishing line at high speed, whereas the second main gear 19 is used for winding the fishing line at low speed. The first pinion gear 21 and the second pinion gear 22 are respectively mounted to the spool shaft 2 in a rotatable state. Simultaneously, the first pinion gear 21 is meshed with the first main gear 18, whereas the second pinion gear 22 is meshed with the second main gear 19. The engaging piece 23 couples either the first main gear 18 or the second main gear 19 to the handle shaft 20. Accordingly, handle rotation is delivered to the coupled one of the first main gear 18 and the second main gear 19 via the handle shaft 20. The first compression spring 24a is disposed on the left side of the engaging piece 23 in FIG. 2. The first compression spring 24a urges the operation shaft 25 in an axially outward direction (i.e., rightward in FIG. 2) through the engaging piece 23 and the second compression spring 24b to be described. The second compression spring 24b is disposed on the right side of the engaging piece 23 in FIG. 2. The second compression spring 24b urges the engaging piece 23 towards the second main gear 19. The operation shaft 25 sets the engaging piece 23 to be in either a high speed position or a low speed position. The engaging piece 23 is engaged with the first main gear 18 in the high speed position, whereas the engaging piece 23 is engaged with the second main gear 19 in the low speed position. In FIG. 2, the engaging piece 23 set to be in the high speed position is depicted with a solid line, whereas the engaging piece 23 set to be in the low speed position is depicted with a dashed two-dotted line.

As illustrated in FIG. 2, the first pinion gear 21 is a tubular member. The first pinion gear 21 is made of anti-corrosive metal (e.g., non-magnetic stainless alloy). The right end of the first pinion gear 21 is supported by a fourth bearing 16d in a rotatable state. The fourth bearing 16d is attached to the bulged portion 12d while being disposed about the spool shaft 2. On the other hand, the left end of the first pinion gear 21 is engaged with a drag disc 42 of the lever drag mechanism 9 while being unitarily rotatable therewith. The second pinion gear 22 is a tubular member made of the same material as the first pinion gear 21. The left end of the second pinion gear 22 is engaged with the drag disc 42 while being unitarily rotatable therewith. The engaging piece 23 is disposed within a slit of the handle shaft 20 in a non-rotatable state. As illustrated in FIG. 2, the operation shaft 25 is inserted through the through hole 20b of the handle shaft 20. In FIG. 2, the right end of the operation shaft 25 protrudes axially outwards of the handle 4 (i.e., rightward in FIG. 2). The operation shaft 25 can be thereby pressed leftward in FIG. 2. The operating shaft 25 is supported by a nut member 29 while being axially movable. The nut member 29 serves to fix to the handle shaft 20 the handle 4 screwed onto the protruding end of the handle shaft 20.

As illustrated in FIG. 2, the speed change operating mechanism 7 includes the handle 4, the handle shaft 20 including the nut member 29, the first compression spring 24a, the operating shaft 25, a lock member 30, a spring member (not illustrated in the figures) functioning as a lock member urging member, a base member 31, and a case member 32.

As illustrated in FIG. 2, the handle 4 includes the handle arm 4a and a handle knob 4b. The handle arm 4a has a through hole 4c penetrating therethrough in a direction intersecting with the longitudinal direction. The handle knob 4b is rotatably attached to the tip of the handle aim 4a. The handle arm 4a is a plate member made of metal. The nut member 29, which forms a part of the handle shaft 20, is fitted into the non-circular through hole 4c formed in the base end of the handle arm 4a in a unitarily rotatable state. As illustrated in FIG. 2, the handle shaft 20 has a female threaded portion 20a in the base-end side inner periphery of the through hole 20b. A male threaded portion 29a of the nut member 29 is screwed into the female threaded portion 20a. The handle shaft 20 and the nut member 29 are thereby unitarily rotatable. The nut member 29 has a head portion with a hexagonal outer contour. The head portion is engaged with a non-circular hole of the base member 31 fixed to the handle arm 4a while being relatively non-rotatable therewith. The nut member 29 has a through hole in the center part thereof. A shaft portion 25a of the operating shaft 25 is movably inserted through the through hole.

As illustrated in FIG. 2, the lever drag mechanism 9 includes the friction disc 41, the drag disc 42, and a moving mechanism 43. The friction disc 41 is attached to the right end of the spool 3 in FIG. 2. The drag disc 42 is opposed to the friction disc 41. The moving mechanism 43 is configured to axially reciprocate the spool shaft 2.

As illustrated in FIG. 2, the friction disc 41 is a disc washer member made of abrasion-resistant material (e.g., carbon graphite, fiber reinforced resin, etc.). The friction disc 41 is fixed to the outer surface of the right-side flange 3b of the spool 3 by means of a plurality of attachment bolts circumferentially arranged at predetermined intervals.

As illustrated in FIG. 2, the drag disc 42 includes a disc body 45 and a brake disc 46. The disc body 45 is engaged with the first pinion gear 21 and the second pinion gear 22 while being unitarily rotatable therewith. The brake disc 46 is fixed to the disc body 45 by means of a plurality of attachment bolts while being opposed to the friction disc 41. The brake disc 46 is made of, for instance, stainless steel. Again, the disc body 45 is a disc member produced by aluminum die casting. The disc body 45 is supported by the spool shaft 2 through a third bearing 16c in a rotatable state. The brake disc 46 is fixed to the surface of the disc body 45, i.e., the surface opposed to the spool 3.

Figure 3:
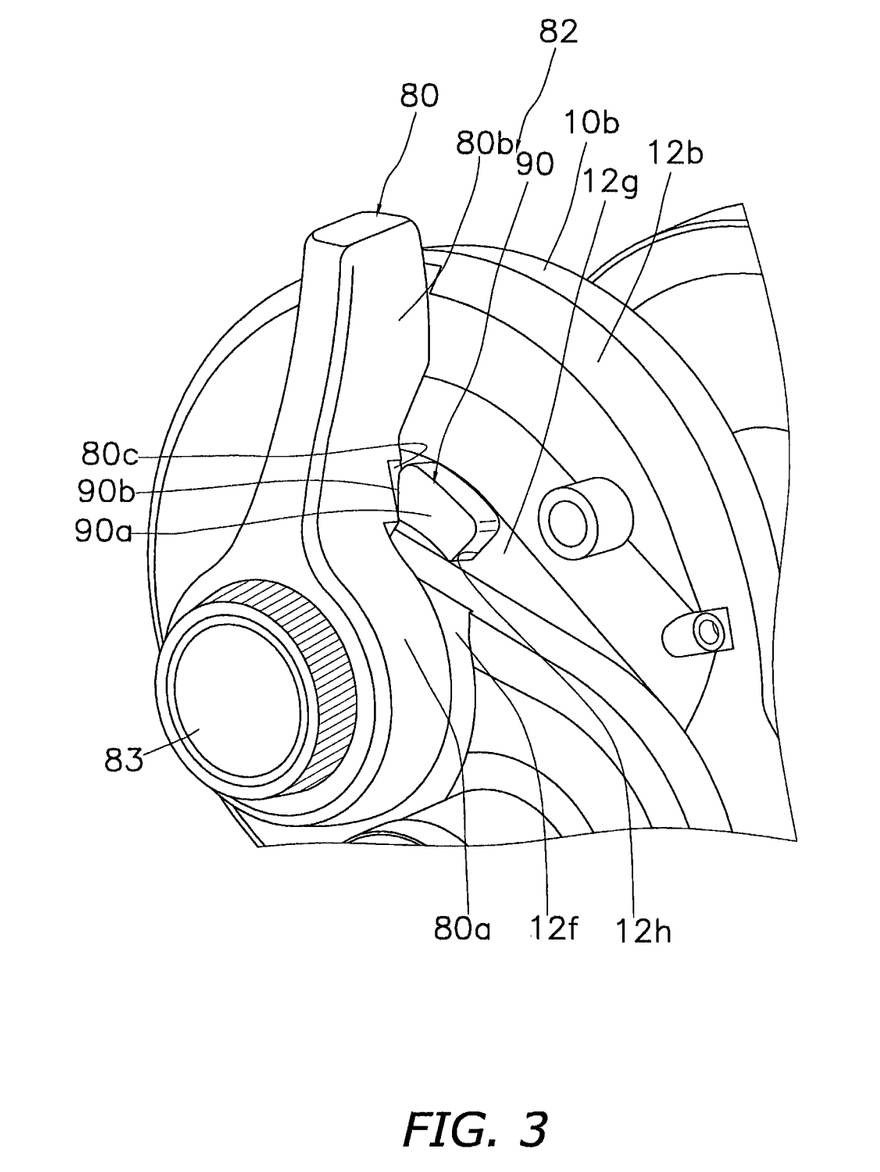
FIG. 3 is an enlarged perspective view of an intermediate positioning mechanism of the dual-bearing reel.

As illustrated in FIGS. 1 to 3, the moving mechanism 43 includes a drag lever 80, a pull mechanism 81, the second spring member 17b, an intermediate positioning mechanism 82 and a drag regulation knob 83. The drag lever 80 is pivotably attached to the outer periphery of a second support tubular portion 12f of the second cover member 12b and is an example of a drag regulation lever. The pull mechanism 81 is configured to pull and move the spool shaft 2 to the rightward of FIG. 2 in response to a clockwise pivot of the drag lever 80 in FIG. 1. The second spring member 17b is configured to urge and move the spool shaft 2 to the leftward in FIG. 2 in response to a counterclockwise movement of the drag lever 80 in FIG. 1. The intermediate positioning mechanism 82 can appropriately set the drag lever 80 to be in an intermediate position. Further, the intermediate positioning mechanism 82 allows an angler to perform a retracting operation of a positioning member 90 with a finger of the hand used for operating the drag lever 80. The drag regulation knob 83 is attached to the end of the spool shaft 2, i.e., the end supported by the second tubular portion 12f in order to regulate the braking force of the drag lever 80.

As illustrated in FIGS. 1 to 3, the drag lever 80 is attached to the outer periphery of the second tubular portion 12f of the second cover member 12b while being pivotable between a free position and a maximum position. The free position corresponds to a drag free state whereby the spool 3 can be freely rotated, whereas the maximum position corresponds to a maximum drag state of the drag mechanism. The pivot range of the drag lever 80 is restricted for allowing the drag lever 80 to pivot between the free position and the maximum position. The drag lever 80 has an attachment portion 80a and an operating portion 80b. The attachment portion 80a extends radially outwards of the spool shaft 2. The attachment portion 80a is pivotably attached to the outer periphery of the second tubular portion 12f protruding on the lateral surface of the second cover member 12b. The operating portion 80b extends from the top surface of the attachment portion 80a to the lever tip. The operating portion 80b can be operated and pivoted in the back-and-forth direction.

As illustrated in FIG. 2, the attachment portion 80a is non-rotatably locked with a cam member (not illustrated in the figures) forming a part of the moving mechanism 43. The attachment portion 80a is configured to move the spool shaft 2 and the spool 3 along the spool shaft direction in response to a pivot operation of the operating portion 80b. As illustrated in FIGS. 1 and 3, the attachment portion 80a is a tubular portion with a roughly circular outer contour. The spool shaft 2 is attached to the lateral surface center part of the attachment portion 80a. Further, the cap-shaped drag regulation knob 83 is attached to the end of the spool shaft 2. The operating portion 80b, which extends towards the lever tip, is integrally formed with the top surface of the attachment portion 80a.

As illustrated in FIGS. 1 to 3, the operating portion 80b is a portion extending from the top surface of the attachment portion 80a to the lever tip. The operating portion 80b can be operated and pivoted in the back-and-forth direction (note a forward direction corresponds to a clockwise direction in FIG. 1, whereas a rearward direction corresponds to a counterclockwise direction in FIG. 1). The operating portion 80b is pivotably disposed while being opposed to the lateral surface of the second cover member 12b and the lateral surface of a protruding portion 12g laterally protruding from the lateral surface of the second cover member 12b at a slight clearance. As illustrated in FIG. 3, the lateral surface of the protruding portion 12g protruding further laterally than the lateral surface of the second cover member 12b, while the second tubular portion 12f, receiving the attachment portion 80a mounted thereto, protrudes further laterally than the lateral surface of the protruding portion 12g. As illustrated in FIG. 3, the positioning member 90 to be described is protrudably/retractably mounted on the lateral surface of the protruding portion 12g. Further, the operating portion 80b has a contact portion 80c on the front surface of the base end thereof. The contact portion 80c appropriately set the drag lever 80 to be in the intermediate position, while making contact with a contact portion 90b of the positioning member 90 to be described.

As illustrated in FIG. 3, the contact portion 80c is formed on the front surface of the operating portion 80b while being disposed closer to the attachment portion 80a than the longitudinal center of the operating portion 80b. The contact portion 80c is a portion for positioning the drag lever 80 in the intermediate position while making contact with the contact portion 90b of the positioning member 90. The contact portion 80c is formed on the front surface of the base end (i.e., a root portion) of the operating portion 80b. The contact portion 80c is a recess which is recessed on a contact part of the operating portion 80b with the contact portion 90b of the positioning member 90. The contact portion 80c is also a recess cut out for making contact with the entirety of the contact portion 90b formed on the rear surface of the positioning member 90. The outer contour of the contact portion 90b of the positioning member 90 is formed in a rectangular shape elongated in an up-and-down direction. The inner contour of the contact portion 80c is formed in a rectangular shape elongated in the up-and-down direction and is slightly larger than the contact portion 90b of the positioning member 90. Therefore, the opposed surfaces of the contact portions 80c and 90b can entirely make contact with each other.

Figure 4:
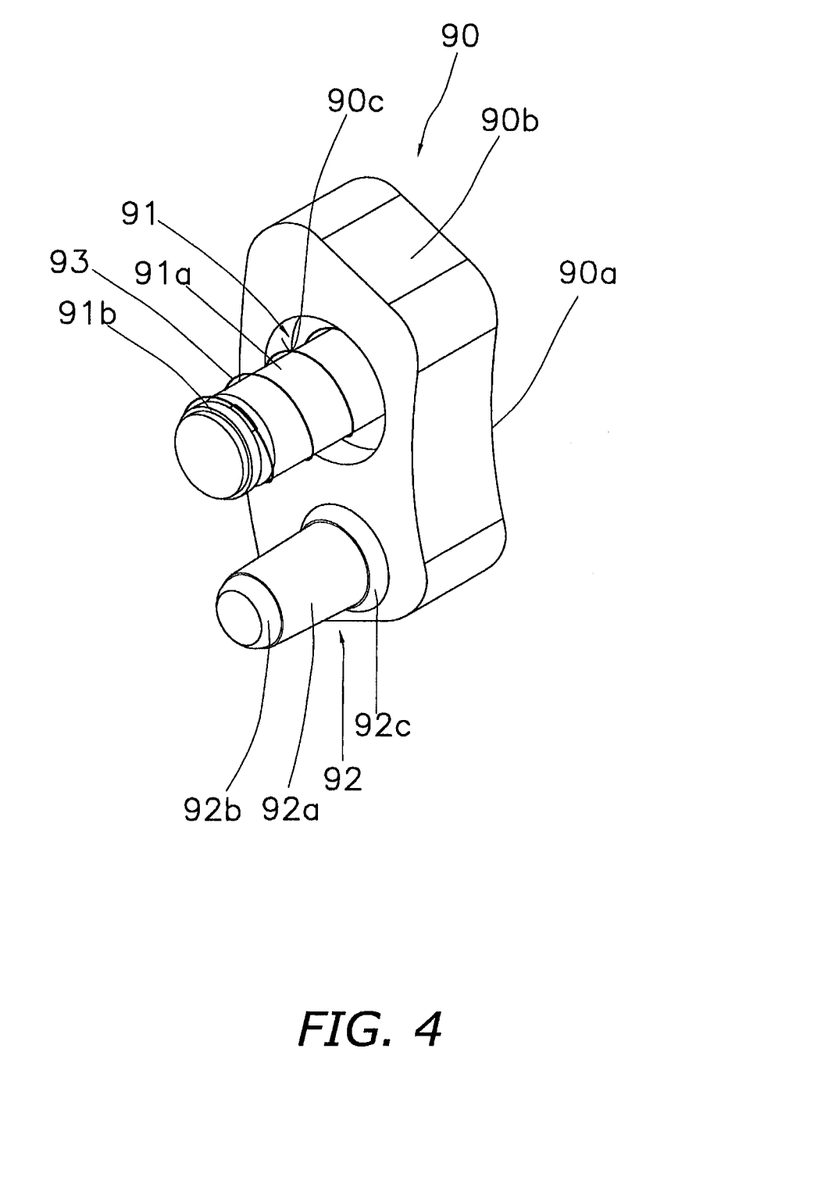
FIG. 4 is an enlarged perspective view of a positioning member of the intermediate positioning mechanism.
Figure 5:
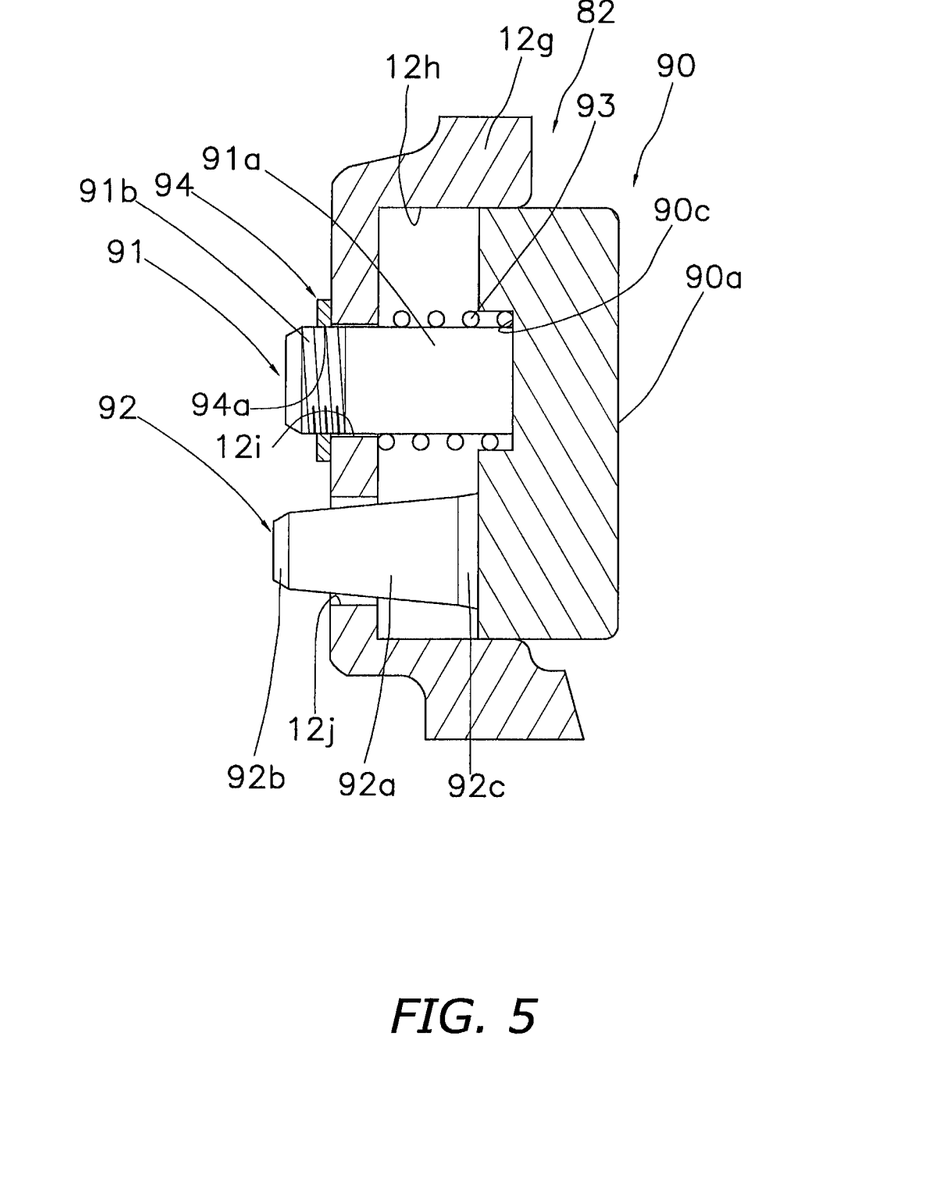
FIG. 5 is an enlarged cross-sectional view of the positioning member.

As illustrated in FIGS. 1 and 3, the intermediate positioning mechanism 82 is a mechanism for setting the drag lever 80 to be in the intermediate position by causing the positioning member 90 to make contact with the contact portion 80c formed on the front surface of the base end of the operating portion 80b when the drag lever 80 is operated and pivoted towards the intermediate position from the free position. Further, the intermediate positioning mechanism 82 allows an angler to perform a retracting operation of the positioning member 90 with a finger of the hand used for operating the drag lever 80. As the intermediate position of the drag lever 80, a strike position is normally set for obtaining a drag of roughly one-third of the tensile strength of the fishing line. As illustrated in FIGS. 3 to 5, the intermediate positioning mechanism 82 includes the positioning member 90, a first spring member 93, a first guide part 91, and a second guide part 92. The positioning member 90 is protrudably/retractably attached to the lateral surface of the protruding portion 12g laterally protruding from the lateral surface of the second cover member 12b in the intermediate position between the free position and the maximum position. The first spring member 93 is attached between the lateral surface of the protruding portion 12g and the positioning member 90 for urging the positioning member 90 in the protruding direction. The first guide part 91 penetrates through the lateral surface of the protruding portion 12g. The first guide part 91 is disposed upright on an opposed surface of the positioning member 90 to the lateral surface of the protruding portion 12g. The first spring member 93 is attached about the first guide part 91. The second guide part 92 penetrates through the lateral surface of the protruding portion 12g. The second guide part 92 is disposed upright on the opposed surface of the positioning member 90 to the lateral surface of the protruding portion 12g. The second guide part 92 is disposed away from the first guide part 91 at a predetermined interval.

As illustrated in FIGS. 1, 3 and 5, the positioning member 90 is a quadratic prism member with a roughly trapezoidal outer contour that the top side thereof is longer than the bottom side thereof in a side view. Further, the top and bottom sides are curved slightly upwards. The positioning member 90 has a press operating portion 90a, the contact portion 90b, and a first accommodating recess 90c. The press operating portion 90a is formed on the lateral surface of the positioning member 90. A retracting operation of the press operating portion 90a can be performed with a finger of the hand used for operating the drag lever 80. The contact portion 90b is formed on the rear surface of the positioning member 90. The contact portion 90b can make contact with the contact portion 80c of the drag lever 80. The first accommodating recess 90c is recessed on a positioning member 90 surface disposed on the opposite side of the press operating portion 90a. The first accommodating recess 90c can accommodate an end of the first spring member 93. As illustrated in FIGS. 4 and 5, the first guide part 91, which is disposed upright on the center part of the first accommodation recess 90c, and the second guide part 92, which is disposed upright in parallel to and away from the first guide part 91 at a predetermined interval, are integrally formed with the positioning member 90 lateral surface disposed on the opposite side of the press operating portion 90a. Further, as illustrated in FIG. 5, the positioning member 90 is protrudably/retractably attached to an attachment recess 12h recessed on the lateral surface of the protruding portion 12g. The attachment recess 12h is a recess with a roughly trapezoidal inner contour. The inner contour of the attachment recess 12h is similar to and slightly larger than the outer contour of the positioning member 90.

As illustrated in FIG. 5, the first guide part 91 is a roughly columnar member. The first guide part 91 penetrates through a first through hole 12i formed in the lateral surface of the attachment recess 12h. The first guide part 91 is disposed upright on the opposed surface of the positioning member 90 to the lateral surface of the attachment recess 12h. The first spring member 93 is attached about the first guide part 91. As illustrated in FIGS. 4 and 5, the first guide part 91 is disposed upright on the center part of the first accommodating recess 90c, while being integrally formed with the positioning member 90. The first guide part 91 has a main body 91a having a roughly columnar shape and a male threaded portion 91b formed on the tip side outer peripheral surface of the main body 91a. The male threaded portion 91b penetrates through the first through hole 12i while the first spring member 93 is attached onto the outer periphery of the main body 91a. Further, a female threaded portion 94a, which is formed in the inner periphery of a first plate member 94, is screwed onto the male threaded portion 91b while being attached to the opposite lateral surface of the attachment recess 12h. Accordingly, the positioning member 90 is urged in the protruding direction (i.e., rightwards in FIG. 5) while being prevented from being detached from the attachment recess 12h.

As illustrated in FIG. 5, the second guide part 92 is a roughly columnar trapezoidal member disposed upright on the opposed surface of the positioning member 90 to the lateral surface of the attachment recess 12h. The second guide part 92 penetrates through a second through hole 12j formed in the lateral surface of the attachment recess 12h. As illustrated in FIGS. 4 and 5, the second guide part 92 is disposed in parallel to and away from the first guide part 91 at a predetermined interval. The second guide part 92 is integrally formed with the positioning member 90. The second guide part 92 has a main body 92a, a small-diameter portion 92b, and a large-diameter portion 92c. The main body 92a has a roughly columnar trapezoidal shape. The small-diameter portion 92b is formed on the tip of the main body 92a. The small-diameter portion 92b has a diameter smaller than that of the main body 92a. The small-diameter portion 92b penetrates through the second through hole 12j. The large-diameter portion 92c is formed on the base end of the main body 92a. The large-diameter portion 92c has a diameter larger than that of the main body 92a. The large-diameter portion 92c is integrally formed with the positioning member 90. A retracting operation of the positioning member 90 can be herein easily performed by forming two guide parts, i.e., the first guide part 91 and the second guide part 92.

As illustrated in FIGS. 4 and 5, the first spring member 93 is a coil spring attached between the lateral surface of the protruding portion 12g and the positioning member 90 for urging the positioning member 90 in the protruding direction. The first spring member 93 is attached about the first guide part 91 in a compressed state. Therefore, the first spring member 93 urges the positioning member 90 in the protruding direction (i.e., rightwards in FIG. 5).

In the lever drag reel structured as described above, the drag lever 80 is pivoted in regulating magnitude of the drag force of the lever drag mechanism 9. When the drag lever 80 is set to be in the drag free position (i.e., the outermost pivot position in the counterclockwise direction in FIG. 1), the friction disc 41 is separated away from the drag disc 42 in the lever drag mechanism 9. A drag release state is thus produced and the spool 3 can be freely rotated. Casting can be performed under the condition. When the drag lever 80 is operated and pivoted therefrom in the clockwise direction in FIG. 1, the friction disc 41 is gradually moved outwards in the spool shaft direction (i.e., rightwards in FIG. 2) and the spool shaft 2 and the spool 3 are gradually moved rightwards. Consequently, press-contact force of the friction disc 41 to the drag disc 42 is increased and drag force can be thus increased.

When the drag lever 80 is then operated and pivoted towards the intermediate position from the free position, the contact portion 90b of the positioning member 90 makes contact with the contact portion 80c formed on the front surface of the base end of the operating portion 80b. Accordingly, the drag lever 80 is appropriately positioned in the intermediate position. When the drag lever 80 is operated and pivoted towards the maximum position across the intermediate position, the contact portion 90b of the positioning member 90 can be prevented from making contact with the contact portion 80c of the operating portion 80b by performing a retracting operation of the positioning member 90 with a finger of the hand used for operating the drag lever 80 before the drag lever 80 reaches the intermediate position.

In the aforementioned intermediate positioning mechanism 82 of the lever drag reel, the positioning member 90 is protrudably/retractably attached to the lateral surface of the reel unit 1, while the drag lever 80 has the contact portion 80c that is formed on the base end of the operating portion 80b and makes contact with the contact portion 90b of the positioning member 90 for appropriately positioning the drag lever 80 in the intermediate position. The positioning member 90 is herein disposed on the lateral surface of the reel unit 1. Therefore, the fishing line can be prevented from easily getting stuck with the positioning member 90 compared to the structure that the positioning member 90 is disposed on the top surface of the reel unit 1. Further, the contact portion 80c of the drag lever 80 is herein formed on the base end of the operating portion 80b. Therefore, it is not required to provide the contact portion 80c on the tip of the operating portion 80b unlike the well-known structure. As a result, it is possible to form the tip of the operating portion 80b in a shape easily operable by an angler.

Other Exemplary Embodiments (a) In the aforementioned exemplary embodiment, the medium-sized lever drag reel has been exemplified. However, application of the present invention is not limited to the medium-sized lever drag reel. The present invention can be applied to any types of dual-bearing reels as long as they include the intermediate positioning mechanism 82.

(b) In the aforementioned exemplary embodiment, the contact portion 80c of the drag lever 80 is formed on the front surface of the base end of the operating portion 80b. However, the contact portion 80c can be disposed in, for instance, a recess slightly dented on the front surface of the base end of the operating portion 80b as long as the contact portion 80c is disposed closer to the attachment portion 80a than the longitudinal center of the operating portion 80b is.

Figure 6:
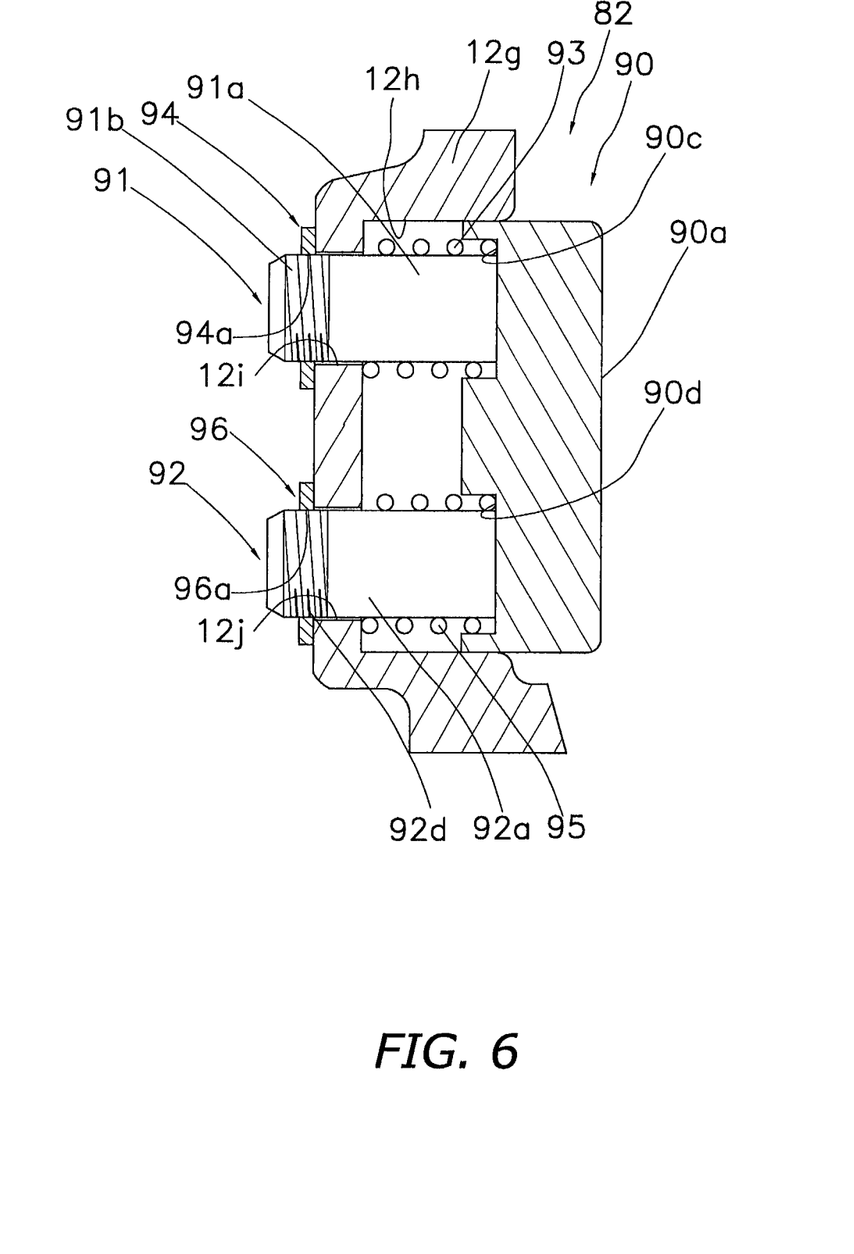
FIG. 6 is a diagram according to another exemplary embodiment, which corresponds to FIG. 5.

(c) In the aforementioned exemplary embodiment, the second guide part 92 is a roughly columnar trapezoidal member. However, the second guide part 92 can be a roughly cylindrical member as illustrated in FIG. 6. Specifically, the second guide part 92 penetrates through the second through hole 12j formed in the lateral surface of the attachment recess 12h. The second guide part 92 is disposed upright on the opposed surface of the positioning member 90 to the lateral surface of the attachment recess 12h. Further, a second spring member 95 is attached about the second guide part 92. The second guide part 92 is herein integrally formed with the positioning member 90, while being disposed upright on the center part of a second accommodating recess 90d. The second accommodating recess 90d is recessed on a positioning member 90 lateral surface disposed on the opposite side of the press operating portion 90a. The second accommodating recess 90d can accommodate an end of the second spring member 95. The second guide part 92 has the main body 92a having a roughly columnar shape and a male threaded portion 92d formed on the tip side outer peripheral surface of the main body 92a. The male threaded portion 92d penetrates through the second through hole 12j while the second spring member 95 is attached onto the outer periphery of the main body 92a. Further, a female threaded portion 96a, which is formed in the inner periphery of a second plate member 96, is screwed onto the male threaded portion 92d while being attached to the opposite lateral surface of the attachment recess 12h. Accordingly, the positioning member 90 is urged in the protruding direction (i.e., rightwards in FIG. 6) while being prevented from being detached from the attachment recess 12h. Two members, i.e., the first spring member 93 and the second spring member 95 are herein provided for two parts, i.e., the first guide part 91 and the second guide part 92. Accordingly, a retracting operation of the positioning member 90 can be further easily performed.

Advantageous Effects of Invention

According to the drag regulation mechanism for a dual-bearing reel of the present invention, the positioning member is protrudably/retractably attached to the lateral surface of the reel unit, while the drag regulation lever has the contact portion. The contact portion is herein disposed closer to the attachment portion than the longitudinal center of the operating portion is. Further, the contact portion can appropriately set the drag regulation lever to be in the intermediate position, while the positioning member makes contact therewith. Therefore, the fishing line can be prevented from getting stuck with the positioning member, while the drag regulation lever can be formed in an easily operable shape.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel drag regulation mechanism configured to regulate drag force braking a spool rotatable with respect to a reel unit, the dual-bearing reel drag regulation mechanism comprising:
    a drag regulation lever including
    an attachment portion attached to a lateral surface of the reel unit, the attachment portion configured to pivot about a rotation axis of the spool between a free position and a maximum position, the free position corresponding to a drag free state for the spool to be freely rotated, the maximum position corresponding to a maximum drag state of the drag mechanism, and
    an operating portion extending from the attachment portion to a tip of the drag regulation lever, the operating portion configured to pivot; and
    an intermediate positioning mechanism including a positioning member,
    the positioning member retractably attached to the lateral surface of the reel unit at an intermediate position between the free position and the maximum position, the positioning member being arranged to be in a protruding state or a retracting state,
    the intermediate positioning mechanism configured to cause the positioning member to make contact at the intermediate position with a contact portion of the operating portion in pivoting the drag regulation lever, when the positioning member is in the protruding state,
    the contact portion of the operating portion disposed closer to the attachment portion than a longitudinal center of the operating portion.

2. The dual-bearing reel drag regulation mechanism according to claim 1, wherein
    the contact portion is formed on a base end of the operating portion.

3. The dual-bearing reel drag regulation mechanism according to claim 1, wherein
    the contact portion includes a recess portion,
    the recess portion is formed in a recessed shape,
    the recess portion is configured to contact with the positioning member.

4. The dual-bearing reel drag regulation mechanism according to claim 1, wherein
    the intermediate positioning mechanism further includes a spring member urging outwardly the positioning member,
    the spring member is mounted between the lateral surface of the reel unit and the positioning member.

5. The dual-bearing reel drag regulation mechanism according to claim 4, wherein
    the intermediate positioning mechanism further includes a first guide part,
    the first guide part is disposed upright on a surface of the positioning member opposed to the lateral surface of the reel unit,
    the first guide part is fitted with the spring member attached thereabout, and
    the first guide part penetrates through the lateral surface of the reel unit.

6. The dual-bearing reel drag regulation mechanism according to claim 1, wherein
    the positioning member being configured to be selectively arranged in a protruding state and a retracting state.

7. A dual-bearing reel drag regulation mechanism configured to regulate drag force braking a spool rotatable with respect to a reel unit, the dual-bearing reel drag regulation mechanism comprising:
    a drag regulation lever including
    an attachment portion attached to a lateral surface of the reel unit, the attachment portion configured to pivot about a rotation axis of the spool between a free position and a maximum position, the free position corresponding to a drag free state for the spool to be freely rotated, the maximum position corresponding to a maximum drag state of the drag mechanism, and
    an operating portion extending from the attachment portion to a tip of the drag regulation lever, the operating portion configured to pivot; and
    an intermediate positioning mechanism including a positioning member,
    the positioning member retractably attached to the lateral surface of the reel unit at an intermediate position between the free position and the maximum position, the positioning member being arranged to be in a protruding state or a retracting state, the intermediate positioning mechanism configured to cause the positioning member to make contact at the intermediate position with a contact portion of the operating portion in pivoting the drag regulation lever, when the positioning member is in the protruding state, the contact portion of the operating portion disposed closer to the attachment portion than a longitudinal center of the operating portion, the intermediate positioning mechanism including a spring member urging outwardly the positioning member and a first guide part, the spring member being mounted between the lateral surface of the reel unit and the positioning member, the first guide part being disposed upright on a surface of the positioning member opposed to the lateral surface of the reel unit, the first guide part being fitted with the spring member attached thereabout, the first guide part penetrates through the lateral surface of the reel unit, the intermediate positioning mechanism further including a second guide part, the second guide part being disposed upright on the surface of the positioning member opposed to the lateral surface of the reel unit, the second guide part being disposed away from the first guide part at a predetermined interval, and the second guide part penetrating through the lateral surface of the reel unit.

* * * * *